US009649655B2

(12) United States Patent
Yada et al.

(10) Patent No.: US 9,649,655 B2
(45) Date of Patent: May 16, 2017

(54) COATING APPARATUS AND LIQUID SURFACE DETECTING METHOD

(71) Applicant: Tokyo Electron Limited, Tokyo (JP)

(72) Inventors: Jun Yada, Kumamoto (JP); Shigeto Tsuruta, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 339 days.

(21) Appl. No.: 14/277,162

(22) Filed: May 14, 2014

(65) Prior Publication Data

US 2014/0347464 A1 Nov. 27, 2014

(30) Foreign Application Priority Data

May 21, 2013 (JP) ................................ 2013-106802

(51) Int. Cl.
*H04N 7/18* (2006.01)
*B05C 5/02* (2006.01)
*B05C 11/10* (2006.01)
*B05B 15/02* (2006.01)

(52) U.S. Cl.
CPC .......... *B05C 5/0254* (2013.01); *B05C 11/101* (2013.01); *B05C 11/1013* (2013.01); *B05C 11/1018* (2013.01); *B05B 15/02* (2013.01)

(58) Field of Classification Search
CPC ..... B05B 15/02; B05C 5/0254; B05C 11/101; B05C 11/1013; B05C 11/1018
USPC ............................................ 348/86; 118/713
See application file for complete search history.

(56) References Cited

U.S. PATENT DOCUMENTS 6,098,029 A * 8/2000 Takagi .................. G01F 23/292 382/100
2008/0304082 A1* 12/2008 Gotz ..................... G01F 23/292 356/614
2009/0067669 A1* 3/2009 Kojima ............... G01F 23/2928 382/100

(Continued)

FOREIGN PATENT DOCUMENTS

JP 09-248514 A 9/1997
JP 2006-150228 A 6/2006

(Continued)

*Primary Examiner* — William Tran

(74) *Attorney, Agent, or Firm* — Abelman, Frayne & Schwab

(57) ABSTRACT

Disclosed is a coating apparatus configured to properly detect a liquid surface of a coating liquid stored within a slit nozzle. The disclosed coating apparatus includes a slit nozzle, a moving mechanism, a storage portion illumination unit, and an imaging unit. The slit nozzle includes an elongated main body, a storage portion configured to store a coating liquid within the main body, and a slit-shaped ejecting port configured to eject the coating liquid fed from the storage portion through a slit-shaped flow path, wherein at least a part of each of a first wall and a second wall which face each other in the main body is formed of a transparent member. The moving mechanism is configured to move the slit nozzle with respect to a substrate. The storage portion illumination unit is configured to illuminate an inside of the storage portion through the transparent member of the first wall. The imaging unit is configured to image the inside of the storage portion through the transparent member of the second wall.

14 Claims, 12 Drawing Sheets

(56) References Cited

U.S. PATENT DOCUMENTS

| | | | | |
|---|---|---|---|---|
| 2010/0005866 | A1* | 1/2010 | Sebok | G01F 1/7086 73/54.43 |
| 2010/0322462 | A1* | 12/2010 | Wu | G06K 9/00 382/100 |
| 2011/0286738 | A1* | 11/2011 | Noda | H01L 21/67253 396/611 |
| 2012/0002012 | A1* | 1/2012 | O'Grady | A61B 6/022 348/45 |
| 2012/0211649 | A1* | 8/2012 | Hallundbæk | E21B 47/102 250/267 |

FOREIGN PATENT DOCUMENTS

| | | | |
|---|---|---|---|
| JP | 2008-068224 | A | 3/2008 |
| JP | 2008-140825 | A | 6/2008 |
| JP | 2012-009812 | A | 1/2012 |

* cited by examiner

FIG.12

| | | ILLUMINATION | | BRIGHTNESS | | IMAGING ANGLE | |
|---|---|---|---|---|---|---|---|
| | | FIRST ILLUMINATION UNIT | SECOND ILLUMINATION UNIT | FIRST BRIGHTNESS | SECOND BRIGHTNESS (>FIRST BRIGHTNESS) | HORIZONTAL | INCLINED |
| COATING LIQUID | TRANS-PARENT | ○ | × | ○ | × | × | ○ |
| | NON-TRANS PARENT | ○ | ○ | × | ○ | ○ | ○ |

COATING APPARATUS AND LIQUID SURFACE DETECTING METHOD

CROSS-REFERENCE TO RELATED APPLICATIONS

This application is based on and claims priority from Japanese Patent Application No. 2013-106802, filed on May 21, 2013, with the Japan Patent Office, the disclosure of which is incorporated herein in its entirety by reference.

TECHNICAL FIELD

The present disclosure relates to a coating apparatus and a liquid surface detecting method.

BACKGROUND

A spin coating method has conventionally been known as a method of coating a coating liquid on a substrate such as, for example, a semiconductor wafer or a glass substrate. The spin coating method is a method of diffusing a coating liquid dropped on a substrate by a centrifugal force to be spread on the substrate. However, the spin coating method is not desirable in terms of use efficiency of the coating liquid because most of the dropped coating liquid is scattered to the outside of the substrate.

Accordingly, a slit coating method has been proposed as a coating method in place of the spin coating method. The slit coating method is a method of applying a coating liquid on a substrate by scanning an elongated slit nozzle having a slit-shaped ejecting port.

For example, a substrate is horizontally placed on a stage, and a coating liquid slightly exposed from the ejecting port of the slit nozzle comes in contact with the substrate. In this state, the slit nozzle is horizontally moved and the coating liquid is drawn out to form a coating film on the substrate (see, e.g., Japanese Patent Laid-Open Publication No. 2008-68224). According to the slit coating method, since the slit nozzle is moved only once from one end of the substrate to the other end, a coating film may be formed on the substrate without dropping the coating liquid outside the substrate.

Here, the slit nozzle disclosed in Japanese Patent Laid-Open Publication No. 2008-68224 is provided with a liquid trapping portion to store the coating liquid, and the coating liquid stored in the liquid trapping portion is ejected from a slit-shaped ejecting port through a slit-shaped path.

SUMMARY

A coating apparatus according to an aspect of the present disclosure includes a slit nozzle, a moving mechanism, a storage portion illumination unit, and an imaging unit. The slit nozzle includes an elongated main body, a storage portion configured to store a coating liquid within the main body, and a slit-shaped ejecting port configured to eject the coating liquid fed from the storage portion through a slit-shaped flow path. At least a part of each of a first wall and a second wall which face each other in the main body is formed of a transparent member. The moving mechanism moves the slit nozzle with respect to a substrate. The storage portion illumination unit illuminates an inside of the storage portion through the transparent member of the first wall. The imaging unit images the inside of the storage portion through the transparent member of the second wall.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 12 is a view illustrating the relationship between the kind of a coating liquid, and illumination units to be used, a brightness of a first illumination unit, and an imaging angle of an imaging unit.

DETAILED DESCRIPTION

Figure 1:
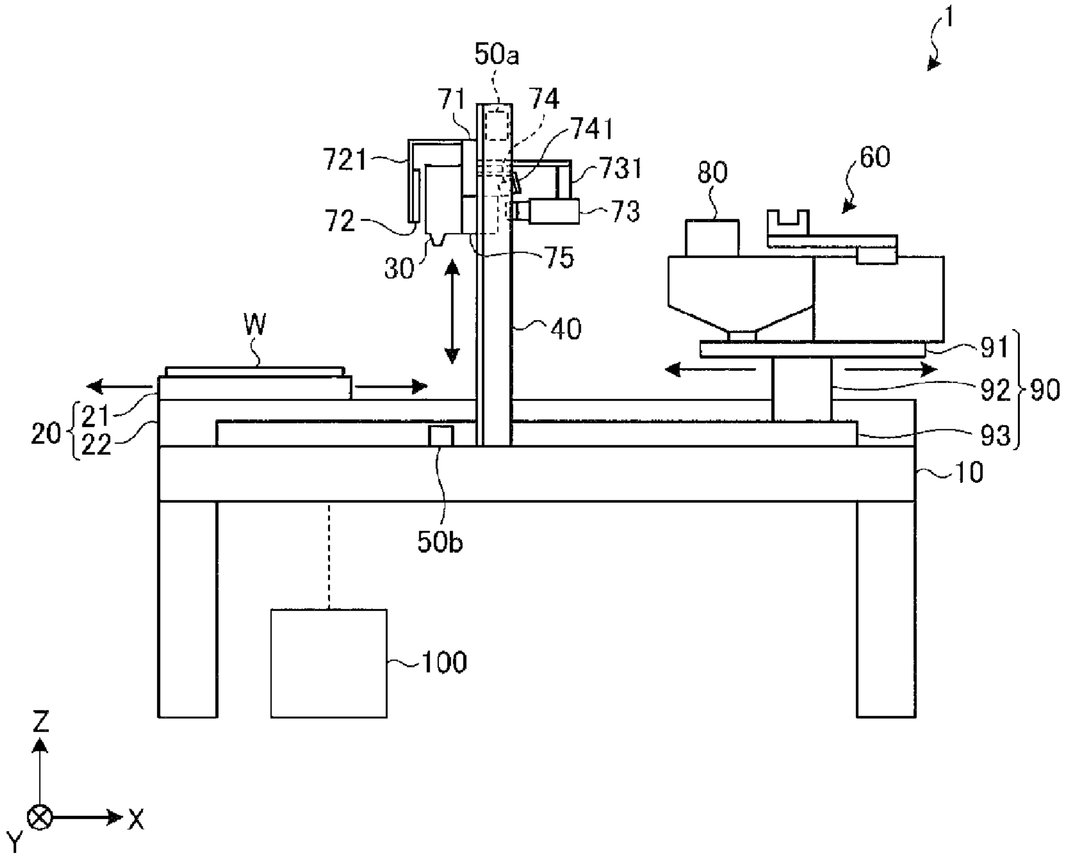
FIG. 1 is a side view schematically illustrating a configuration of a coating apparatus according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

In the above described conventional technology, there is room for further improvement in terms of appropriately detecting the liquid surface of the coating liquid stored within the slit nozzle.

For example, when a liquid surface within the slit nozzle is biased, a head pressure which acts on the ejecting port may become non-uniform, thereby degrading the uniformity of a film thickness. Accordingly, it is important how to appropriately detect the liquid surface within the slit nozzle.

An aspect of the present disclosure is to provide a coating apparatus and a liquid surface detecting method which may properly detect a liquid surface of a coating liquid stored in a slit nozzle.

A coating apparatus according to an aspect of the present disclosure includes a slit nozzle, a moving mechanism, a storage portion illumination unit, and an imaging unit. The slit nozzle includes an elongated main body, a storage portion configured to store a coating liquid within the main body, and a slit-shaped ejecting port configured to eject the coating liquid fed from the storage portion through a slit-shaped flow path. At least a part of each of a first wall and a second wall which face each other in the main body is formed of a transparent member. The moving mechanism moves the slit nozzle with respect to a substrate. The storage portion illumination unit illuminates an inside of the storage portion through the transparent member of the first wall. The imaging unit images the inside of the storage portion through the transparent member of the second wall.

The coating apparatus further includes a second wall illumination unit configured to illuminate a surface of the second wall which faces the imaging unit. The second wall includes reference portions on at least two positions of the surface of the second wall. The reference portions are used for calculating a size per pixel of an image imaged by the imaging unit.

In the coating apparatus, the second wall illumination unit obliquely irradiates a light toward the surface of the second wall which faces the imaging unit.

In the coating apparatus, the imaging unit images a liquid surface of the coating liquid stored in the storage portion from an upper side or a lower side of the liquid surface. When a plurality of liquid surface lines are included in the image imaged by the imaging unit, the coating apparatus further includes a liquid surface determination unit configured to determine a liquid surface line located at an uppermost position among the plurality of liquid surface lines as the liquid surface.

The coating apparatus further includes a flattening determination unit configured to determine whether the liquid surface is flattened based on a determination result by the liquid surface determination unit.

In the coating apparatus, the flattening determination unit determines that the liquid surface is flattened when a difference in height of liquid surfaces at least at left and right end portions of the image is less than a threshold value.

In the coating apparatus, the flattening determination unit divides each of the left and right end portions into a plurality of areas, and uses an average value of liquid surface levels of the plurality of areas except for areas having highest and lowest liquid surface levels in each of the left and right end portions, as a liquid surface level of each of the left and right end portions.

The coating apparatus further includes a brightness switching unit configured to switch a brightness of the storage portion illumination unit between a first brightness and a second brightness which is higher than the first brightness. The first brightness is a brightness in a case where a transparent coating liquid is stored in the storage portion, and the second brightness is a brightness in a case where a coating liquid other than the transparent coating liquid is stored in the storage portion.

Another aspect of the present disclosure is to provide a method of detecting a liquid surface in a slit nozzle. The slit nozzle includes an elongated main body, a storage portion configured to store a coating liquid within the main body, and a slit-shaped ejecting port configured to eject the coating liquid fed from the storage portion through a slit-shaped flow path, at least a part of each of a first wall and a second wall which face each other in the main body being formed of a transparent member. The method includes: illuminating an inside of the storage portion using a storage portion illumination unit through the transparent member of the first wall of the slit nozzle; and imaging the inside of the storage portion using an imaging unit through the transparent member of the second wall of the slit nozzle in a state where the inside of the storage portion is illuminated in the illuminating.

The above-described method further includes: imaging reference portions provided on at least two positions on a surface of the second wall which faces the imaging unit, using the imaging unit while illuminating the surface of the second wall using a second wall illumination unit; and calculating a size per pixel of an image imaged by the imaging unit based on a number of pixels between the reference portions of the image, and an actual distance between the reference portions.

In the above-described method, in the illuminating of the storage portion, the inside of the storage portion is illuminated using the storage portion illumination unit when a transparent coating liquid is stored in the storage portion, and the inside of the storage portion is illuminated using the storage portion illumination unit and the second wall illumination unit when a coating liquid other than the transparent coating liquid is stored in the storage portion.

According to the present disclosure, a liquid surface of a coating liquid stored within a slit nozzle may be properly detected.

Hereinafter, exemplary embodiments of a coating apparatus and a liquid surface detecting method according to the present disclosure will be described in detail with reference to accompanying drawings. The present disclosure is not limited to the exemplary embodiments as described below.

FIG. 1 is a side view schematically illustrating a configuration of a coating apparatus according to an exemplary embodiment of the present disclosure. Hereinafter, an X axis, a Y axis and a Z axis which are orthogonal to each other will be defined in order to clarify the positional relationship. The positive Z-axis direction is defined as a vertical upward direction.

As illustrated in FIG. 1, a coating apparatus 1 according to the present exemplary embodiment includes a mounting unit 10, a first moving mechanism 20, a slit nozzle 30, and an elevating mechanism 40.

The first moving mechanism 20 is a mechanism configured to horizontally move a substrate W, and includes a substrate holding unit 21 and a driving unit 22. The substrate holding unit 21 has a horizontal top surface formed with a suction port, and holds the substrate W on the horizontal top surface through suction from the suction port. The driving unit 22 is placed on the mounting unit 10, and moves the substrate holding unit 21 in the horizontal direction (here, the X-axis direction). As the first moving mechanism 20 moves the substrate holding unit 21 using the driving unit 22, the substrate W held by the substrate holding unit 21 is moved in the horizontal direction.

The slit nozzle 30 is an elongated nozzle which extends in a direction (the Y-axis direction) perpendicular to the movement direction (the X-axis direction) of the substrate W, and is disposed above the substrate W held by the substrate holding unit 21. A specific configuration of the slit nozzle 30 will be described later.

The elevating mechanism 40 is a mechanism configured to move up and down the slit nozzle 30. Specifically, the elevating mechanism 40 vertically moves a fixing member 71 of the slit nozzle 30 using a driving unit (not illustrated) so as to move up and down the slit nozzle 30 supported by the fixing member 71. The fixing member 71 will be described later The coating apparatus 1 according to the present exemplary embodiment further includes the fixing member 71, a first illumination unit 72, an imaging unit 73, a second illumination unit 74, and a reflecting member 75 around the slit nozzle 30. The first illumination unit 72 is disposed at the negative X-axis direction side of the slit nozzle 30, and the fixing member 71, the imaging unit 73, the second illumination unit 74, and the reflecting member 75 are disposed at the side opposite to the side where the first illumination unit 72 of the slit nozzle 30 is disposed.

The fixing member 71 is a member configured to support the slit nozzle 30 and attached to a driving unit (not illustrated) of the elevating mechanism 40 to move up and down together with the slit nozzle 30.

The first illumination unit 72, the imaging unit 73, and the second illumination unit 74 are fixed to the fixing member 71 through supporting members 721, 731, and 741, and the reflecting member 75 is directly fixed to the fixing member 71. Accordingly, the first illumination unit 72, the imaging unit 73, the second illumination unit 74, and the reflecting member 75 move up and down together with the slit nozzle 30 by the elevating mechanism 40 while maintaining their positional relationship in relation to the slit nozzle 30. The peripheral configuration of the slit nozzle 30 will be described later.

The coating apparatus 1 includes a thickness measuring unit 50*a*, a slit nozzle height measuring unit 50*b*, a slit nozzle cleaning unit 60, a slit nozzle waiting unit 80, a second moving mechanism 90, and a control device 100.

The thickness measuring unit 50*a* is a measuring unit disposed above the substrate W (here, on the elevating mechanism 40) to measure a distance to the top surface of the substrate W. The slit nozzle height measuring unit 50*b* is disposed below the substrate W (here, on the mounting unit 10) to measure a distance to the bottom surface of the slit nozzle 30.

The results measured by the thickness measuring unit 50*a* and the slit nozzle height measuring unit 50*b* are transmitted to the control device 100 to be described later, and used to determine the height of the slit nozzle 30 during the coating process. As the thickness measuring unit 50*a* and the slit nozzle height measuring unit 50*b*, for example, a laser displacement meter may be used.

The slit nozzle cleaning unit 60 is a processing unit configured to remove a coating liquid adhered on a tip end portion of the slit nozzle 30. The slit nozzle waiting unit 80 has an accommodating space configured to accommodate the slit nozzle 30. The inside of the accommodating space is maintained under a thinner atmosphere. When the slit nozzle 30 is waiting within such an accommodating space, the coating liquid within the slit nozzle 30 is suppressed from being dried.

The second moving mechanism 90 is a mechanism configured to horizontally move the slit nozzle cleaning unit 60 and the slit nozzle waiting unit 80, and includes a mounting unit 91, a supporting unit 92, and a driving unit 93.

The mounting unit 91 is a plate-shaped member on which the slit nozzle cleaning unit 60 and the slit nozzle waiting unit 80 are substantially horizontally placed. The mounting unit 91 is supported by the supporting unit 92 at a predetermined height, specifically, at a height at which the substrate W held by the substrate holding unit 21 can pass through the space below the mounting unit 91. The driving unit 93 horizontally moves the supporting unit 92.

By horizontally moving the supporting unit 92 using the driving unit 93, the second moving mechanism 90 horizontally moves the slit nozzle cleaning unit 60 and the slit nozzle waiting unit 80 placed on the mounting unit 91.

The control device 100 is a device configured to control the operation of the coating apparatus 1. The control device 100 is, for example, a computer, and includes a control unit 160 and a storage unit 170 (see FIG. 8) as described below. The storage unit 170 stores a program (not illustrated) for controlling various processes such as, for example, a coating process. The control unit 160 reads out and executes the program stored in the storage unit 170 to control the operation of the coating apparatus 1.

The program is recorded in a computer-readable recording medium, and may be installed to the storage unit 170 of the control device 100 from the recording medium. The computer-readable recording medium may be, for example, a hard disk (HD), a flexible disk (FD), a compact disk (CD), a magneto optical disk (MO), or a memory card.

Figure 2:
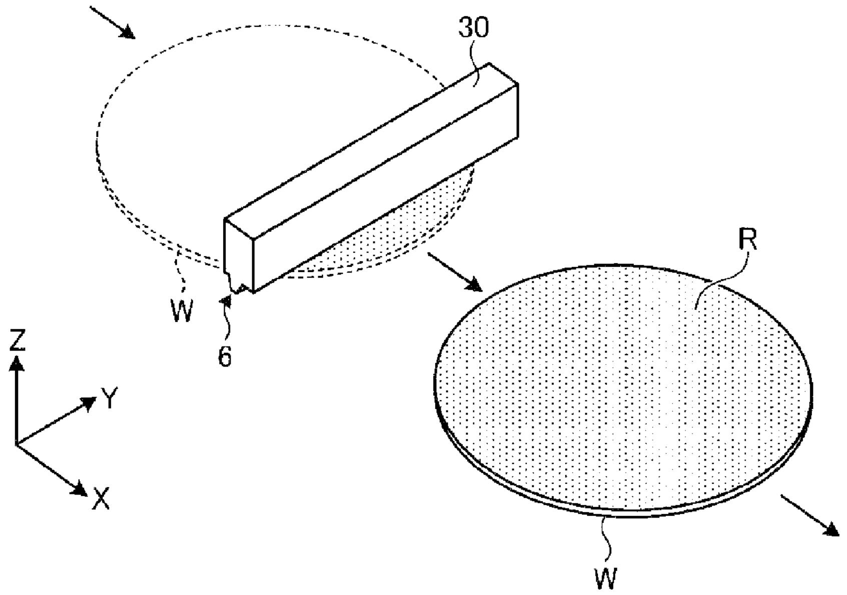
FIG. 2 is an explanatory view schematically illustrating a coating process.

Hereinafter, a coating process executed by the coating apparatus 1 will be schematically described with reference to FIG. 2. FIG. 2 is an explanatory view schematically illustrating a coating process. In the coating process executed by the coating apparatus 1, in a state where a coating liquid exposed from the elongated slit nozzle 30 is in contact with a substrate W, the substrate W is horizontally moved and thereby the coating liquid is spread on the substrate W to form a coating film.

As illustrated in FIG. 2, the slit nozzle 30 is an elongated member which extends in a direction (the Y-axis direction) perpendicular to the movement direction (the X-axis direction) of the substrate W, and ejects a coating liquid R from an elongated ejecting port 6 formed at the lower portion thereof.

The coating apparatus 1, first, exposes the coating liquid R from the ejecting port 6 of the slit nozzle 30. Here, the coating apparatus 1 may maintain the state where the coating liquid R is exposed from the ejecting port 6 by controlling the pressure within the slit nozzle 30.

Subsequently, the coating apparatus 1 moves the slit nozzle 30 downwardly by using the elevating mechanism 40 (see FIG. 1) so that the coating liquid R exposed from the ejecting port 6 comes in contact with the top surface of the substrate W. The coating apparatus 1 horizontally moves the substrate W using the first moving mechanism 20 (see FIG. 1). Accordingly, the coating liquid R is spread on the top surface of the substrate W to form a coating film. The coating film formed on the substrate W by the coating apparatus 1 is a thick film of 10 μm or more.

The slit nozzle 30 according to the present exemplary embodiment includes a storage portion configured to store the coating liquid R, and ejects the coating liquid R replenished in the storage portion from the ejecting port 6 through a slit-shaped flow path. A coating liquid supply system is connected to the storage portion. The coating liquid R is supplied from the coating liquid supply system to be replenished in the storage portion.

Here, when the coating liquid R is replenished in the storage portion, the coating liquid R may be biased within the storage portion. Especially, in the coating apparatus 1, the coating liquid R is likely to be biased since a high viscosity coating liquid R of about several 1000 cP may be used. When the coating liquid R is biased within the storage portion, a head pressure which acts on the ejecting port 6 of the slit nozzle 30 may become non-uniform, thereby degrading the uniformity of film thickness. Accordingly, in order to determine whether the coating liquid R stored within the storage portion becomes flattened, it is desirable to detect a liquid surface of the coating liquid R stored within the storage portion.

Accordingly, the coating apparatus 1 according to the present exemplary embodiment is configured to detect the liquid surface of the coating liquid R stored within the storage portion using, for example, the first illumination unit 72, the imaging unit 73, and the second illumination unit 74 as described above.

Hereinafter, the configuration of the slit nozzle 30 and peripheral devices thereof will be described in detail. In the present exemplary embodiment, descriptions will be made on an example in which a transparent coating liquid is used as a coating liquid R. The transparent coating liquid is, for example, a resist.

Figure 3:
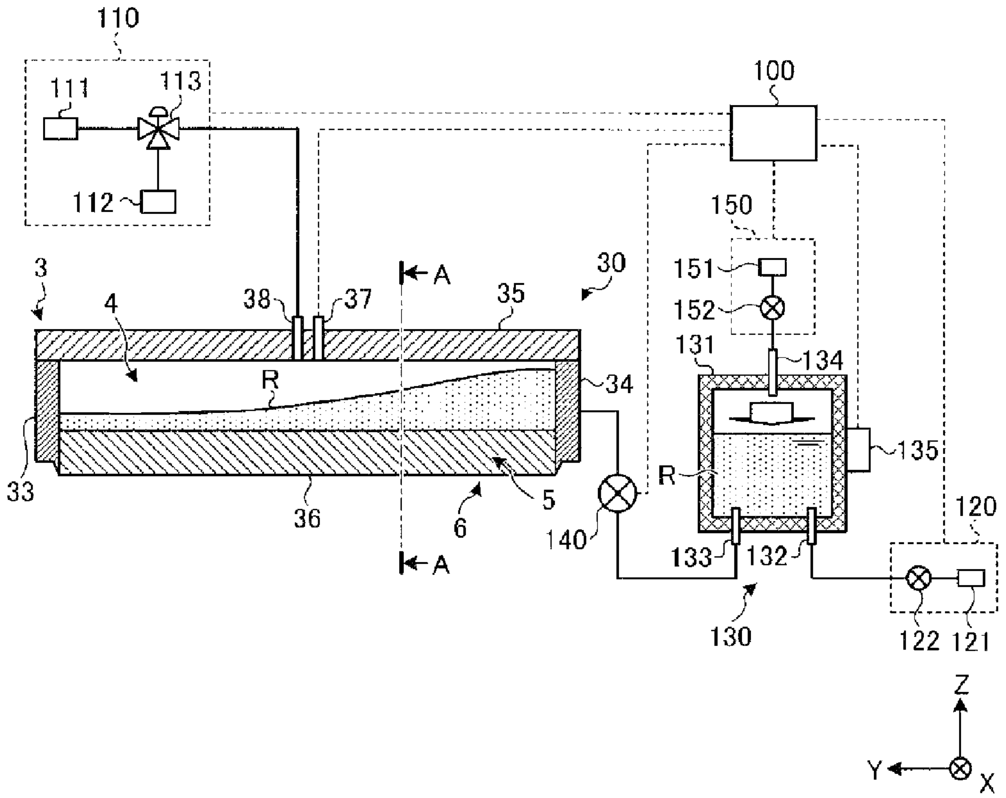
FIG. 3 is a schematic view for explaining the configuration of a slit nozzle and peripheral devices thereof.
Figure 4:
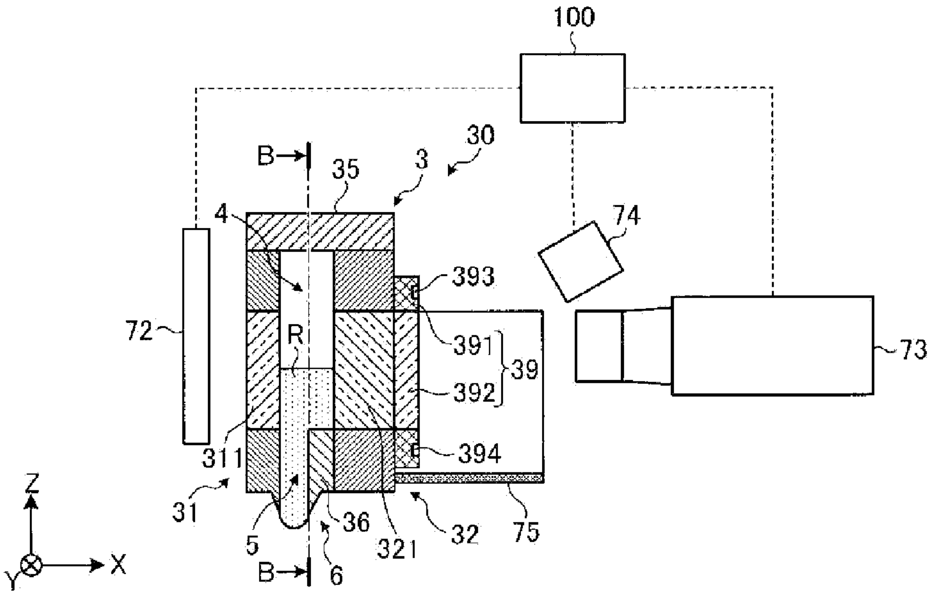
FIG. 4 is a schematic view for explaining the configuration of the slit nozzle and peripheral devices thereof.
Figure 5:
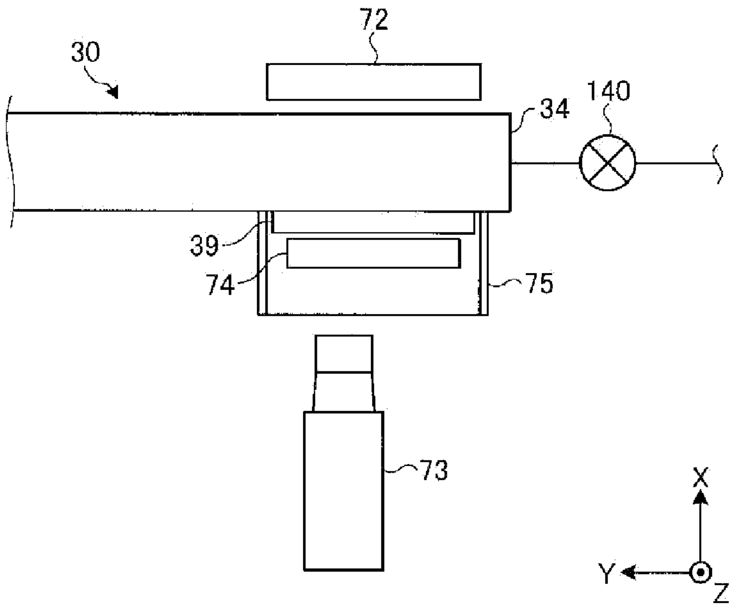
FIG. 5 is a schematic view for explaining the configuration of the slit nozzle and peripheral devices thereof.
Figure 6:
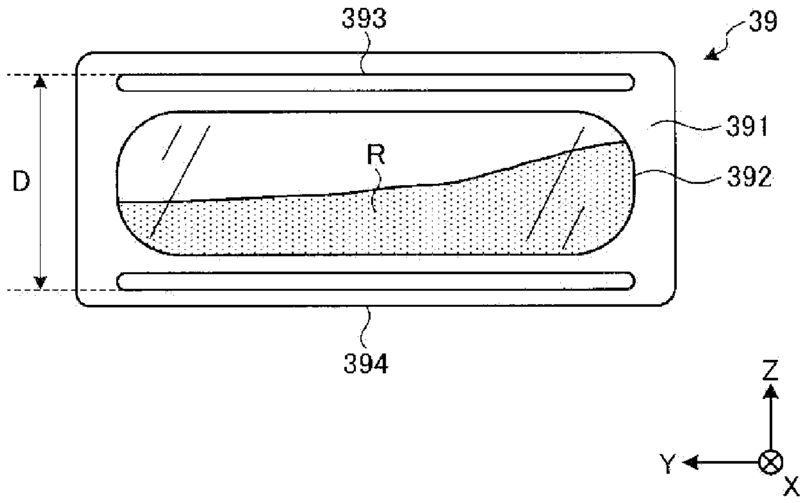
FIG. 6 is a front view schematically illustrating a window unit.

FIGS. 3 to 5 are schematic views for explaining the configuration of the slit nozzle 30 and peripheral devices thereof. FIG. 6 is a front view schematically illustrating a window unit 39. Here, FIG. 3 illustrates a cross-sectional view of the slit nozzle 30 taken in the direction indicated by arrows B-B in FIG. 4, and FIG. 4 illustrates a cross-sectional view of the slit nozzle 30 taken in the direction indicated by arrows A-A in FIG. 3. FIG. 5 illustrates a plan view of the slit nozzle 30.

As illustrated in FIGS. 3 and 4, the slit nozzle 30 includes an elongated main body 3, a storage portion 4 within the main body 3 to store a coating liquid R, and a slit-shaped ejecting port 6 configured to eject the coating liquid R fed from the storage portion 4 through a slit-shaped flow path 5.

The main body 3 of the slit nozzle 30 includes a first wall 31, a second wall 32, a third wall 33, and a fourth wall 34.

The first wall 31 and the second wall 32 are facing walls in a transverse direction of the slit nozzle 30 (here, in the X-axis direction), and are disposed to face each other and to be spaced apart from each other at a predetermined interval.

The third wall 33 and the fourth wall 34 are facing walls in a lengthwise direction of the main body 3 (here, in the Y-axis direction), and are joined to the first wall 31 and the second wall 32 and disposed to face each other and to be spaced apart from each other at a predetermined interval.

The main body 3 of the slit nozzle 30 includes a cover portion 35 which constitutes a ceiling portion of the slit nozzle 30, and an elongated land portion 36 disposed on a surface of the second wall 32 which faces the first wall 31.

In the inner space of the slit nozzle 30 which is formed by the first to fourth walls 31 to 34, the cover portion 35, and the land portion 36, a space interposed between the first wall 31 and the second wall 32 is the storage portion 4. A space interposed between the first wall 31 and the land portion 36 and having a narrower width than the storage portion 4 is the flow path 5. The width of the flow path 5 is fixed, and is the same as the width of the ejecting port 6 formed at the tip end of the flow path 5.

The width of the flow path 5 is set as a value which allows the surface tension of the coating liquid R to be smaller than the gravity which acts on the coating liquid R and the coating liquid R to be dropped from the ejecting port 6 at a predetermined flow rate in a state where the pressure within the storage portion 4 is the same as the pressure outside the storage portion 4. Specifically, the width of the flow path 5 is obtained by changing the width of the flow path 5, the viscosity of the coating liquid R, and the material of the slit nozzle 30, and evaluating the state of the coating liquid R in changed states, in a test which is performed in advance.

A pressure measuring unit 37 and a pressure adjusting tube 38 are provided through the cover portion 35, respectively. The pressure measuring unit 37 is configured to measure the pressure of a sealed space surrounded by a liquid surface of the coating liquid R stored in the storage portion 4 and the inner wall surfaces of the storage portion 4, and the pressure adjusting tube 38 is connected to a pressure control unit 110 configured to adjust the pressure within the sealed space. The pressure measuring unit 37 is electrically connected to the control device 100, and measurement results are input to the control device 100.

There is no limitation in the arrangement of the pressure measuring unit 37 as long as the pressure measuring unit 37 is communicated with the sealed space within the slit nozzle 30. For example, the pressure measuring unit 37 may be provided through the first wall 31.

The pressure control unit 110 has a configuration in which an exhaust unit 111 such as, for example, a vacuum pump, and a gas supply source 112 configured to supply a gas such as, for example, $N_2$, are connected to the pressure adjusting tube 38 via a switching valve 113. The pressure control unit 110 is also electrically connected to the control device 100. When an opening degree of the switching valve 113 is adjusted by a command from the control device 100, either the exhaust unit 111 or the gas supply source 112 may be connected to the pressure adjusting tube 38 so as to adjust a displacement volume from the inside of the storage portion 4 or to adjust an amount of a gas to be supplied into the storage portion 4. Accordingly, the coating apparatus 1 may adjust the measurement result of the pressure measuring unit 37, that is, the pressure within the storage portion 4 to be a predetermined value.

In such a case, the inside of the storage portion 4 may be evacuated so that the pressure within the storage portion 4 may be lower than the pressure outside the storage portion 4. Then, the coating liquid R within the storage portion 4 may be raised upward and suppressed from being dropped from the ejecting port 6. A gas may be supplied into the storage portion 4 so that the coating liquid R remaining within the storage portion 4 after the coating liquid R is applied may be pressurized to be pushed out or purged.

The coating apparatus 1 performs a coating process of the coating liquid R on a substrate W while controlling the pressure of the sealed space formed within the storage portion 4.

The configuration of the pressure control unit 110 is not limited to the present exemplary embodiment, but may be arbitrarily set as long as the pressure within the storage portion 4 is controllable. For example, the pressure adjusting tube 38 and a pressure control valve may be provided in each of the exhaust unit 111 and the gas supply source 112 to be connected to the cover portion 35 separately.

As illustrated in FIG. 3, the slit nozzle 30 is connected to a coating liquid supply system which includes a coating liquid supply unit 120, an intermediate tank 130, a supply pump 140, and a pressurization unit 150.

The coating liquid supply unit 120 includes a coating liquid supply source 121, and a valve 122. The coating liquid supply source 121 is connected to the intermediate tank 130 via the valve 122, and supplies the coating liquid R to the intermediate tank 130. The coating liquid supply unit 120 is electrically connected to the control device 100, and the opening/closing of the valve 122 is controlled by the control device 100 as described above.

The intermediate tank 130 is a tank interposed between the coating liquid supply unit 120 and the slit nozzle 30. The intermediate tank 130 includes a tank portion 131, a first supply tube 132, a second supply tube 133, a third supply tube 134, and a liquid surface sensor 135.

The tank portion 131 stores the coating liquid R. The first supply tube 132 and the second supply tube 133 are provided in the bottom of the tank portion 131. The first supply tube 132 is connected to the coating liquid supply source 121 via the valve 122. The second supply tube 133 is connected to the fourth wall 34 of the slit nozzle 30 through the supply pump 140.

The pressurization unit 150 is connected to the third supply tube 134. The pressurization unit 150 includes a gas supply source 151 configured to supply a gas such as, for example, $N_2$, and a valve 152, and supplies the gas into the tank portion 131 to pressurize the inside of the tank portion 131. The pressurization unit 150 as described above is electrically connected to the control device 100, and the opening/closing of the valve 152 is controlled by the control device 100 as described above.

The liquid surface sensor 135 is a detecting unit configured to detect a liquid surface of the coating liquid R stored in the tank portion 131. The liquid surface sensor 135 is electrically connected to the control device 100, and the detection result is input to the control device 100.

The supply pump 140 is provided in the middle of the second supply tube 133, and supplies the coating liquid R supplied from the intermediate tank 130 to the slit nozzle 30. The supply pump 140 as described above is electrically connected to the control device 100, and the amount of the coating liquid R to be supplied to the slit nozzle 30 is controlled by the control device 100.

As described above, the slit nozzle 30 is connected to the coating liquid supply system which includes the coating liquid supply unit 120, the intermediate tank 130, the supply pump 140, and the pressurization unit 150, and the coating liquid R is supplied into the storage portion 4 from the fourth wall 34 side of the slit nozzle 30 by the coating liquid supply system.

As described above, the coating liquid R may be a high viscosity fluid. Accordingly, when the coating liquid R is supplied into the storage portion 4 from the coating liquid supply system, as illustrated in FIG. 3, the coating liquid R may be stored in the storage portion 4 while leaning to the coating liquid supply system connection side, that is, the fourth wall 34 side.

As illustrated in FIG. 4, a part of the first wall 31 is formed of a transparent member 311, and the coating liquid R stored in the storage portion 4 may be visually recognized through the transparent member 311.

The first illumination unit 72 is a storage portion illumination unit which is disposed at the first wall 31 side of the slit nozzle 30 and illuminates the inside of the storage portion 4 through the transparent member 311 of the first wall 31. Turning on/off and brightness of the first illumination unit 72 are controlled by the control device 100.

The first illumination unit 72 is, for example, a light emitting diode (LED) surface illumination device, and uniformly illuminates the inside of the storage portion 4. It is desirable that the light irradiated by the first illumination unit 72 is a light having a wavelength which does not degrade (e.g., sensitize) the coating liquid R.

A part of the second wall 32 is also formed of a transparent member 321 in the same manner as the first wall 31. The transparent member 321 of the second wall 32 is provided at substantially the same position as the transparent member 311 of the first wall 31 in the horizontal direction (here, the X-axis direction).

The second wall 32 includes the window unit 39. The window unit 39 is a member attached to the external surface of the second wall 32, and as illustrated in FIGS. 4 and 6, includes a main body 391 and a transparent member 392. The transparent member 392 of the window unit 39 is disposed at substantially the same position as the transparent member 321 of the second wall 32 in the horizontal direction. Accordingly, the coating liquid R stored in the storage portion 4 may be visually recognized through the transparent members 392 and 321. The transparent members 311, 321 and 392 may be made of, for example, glass or acrylic resin.

In the example described herein, the transparent members 321 and 392 are provided in the second wall 32 and the window unit 39, respectively. However, the second wall 32 does not have to be necessarily provided with the transparent member 321. For example, the portion provided with the transparent member 321 illustrated in FIG. 4 may be hollow, and the inside of the storage portion 4 may be sealed by the window unit 39.

The imaging unit 73 is disposed at the second wall 32 side of the slit nozzle 30, that is, the window unit 39 side, and images the inside of the storage portion 4 through the transparent members 392 and 321. As for the imaging unit 73, for example, a charge coupled device (CCD) camera may be used. Image data imaged by the imaging unit 73 are input to the control device 100.

The second illumination unit 74 is a second wall illumination unit disposed above the imaging unit 73 and illuminates a surface of the window unit 39 provided in the second wall 32, which faces the imaging unit 73.

As illustrated in FIG. 6, reference portions 393 and 394 are formed on the main body 391 of the window unit 39, above and below the transparent member 392, respectively. The reference portions 393 and 394 may be, for example, groove portions which extend in the longitudinal direction of the main body 3 (here, the Y-axis direction). When the window unit 39 is illuminated by the second illumination unit 74, the imaging unit 73 may image the reference portions 393 and 394 formed on the main body 391 of the window unit 39 as shadows.

The second illumination unit 74 obliquely irradiates a light toward the surface of the window unit 39 which faces the imaging unit 73. Accordingly, it is easy to image the reference portions 393 and 394 as shadows as compared to a case where the surface of the window unit 39 which faces the imaging unit 73 is illuminated from the front side. The second illumination unit 74 may be disposed, for example, below the imaging unit 73 so as to obliquely irradiate a light toward the surface of the window unit 39 which faces the imaging unit 73.

The main body 391 of the window unit 39 is made of a material which hardly reflects the light from the second illumination unit 74 or is processed to hardly reflect the light from the second illumination unit 74. When the reflection by the main body 391 is suppressed in this manner, the shadows of the reference portions 393 and 394 may be more clearly imaged.

A distance D between the reference portions 393 and 394 is already known, and a size per pixel may be calculated from the number of pixels between the reference portions 393 and 394 imaged by the imaging unit 73. This will be described later.

Here, in the above described exemplary case, the reference portions 393 and 394 are groove portions formed on the main body 391 of the window unit 39. However, the reference portions 393 and 394 may be, for example, portions colored with a color different from that of another portion of the main body 391. Here, in the above described exemplary case, the two reference portions 393 and 394 are provided. However, three or more reference portions may be provided.

Here, the second wall 32 may be but not necessarily provided with the window unit 39. That is, the second wall 32 itself may be provided with the reference portions 393 and 394, or may be processed to hardly reflect the light from the second illumination unit 74.

The reflecting member 75 is a member which has a bottom portion, and both side portions joined to the sides of the bottom portion in the Y-axis direction, and is disposed to cover the both sides and the lower side of the window unit 39. The reflecting member 75 is a member which reflects the light irradiated by the second illumination unit 74, and is subjected to, for example, mirror-finishing so as to easily reflect the light. When the reflecting member 75 is provided, the shadows of the reference portions 393 and 394 may be more clearly imaged.

As illustrated in FIG. 5, the first illumination unit 72, the imaging unit 73, the second illumination unit 74, and the reflecting member 75 are disposed to lean to the supply side of the coating liquid R, that is, the fourth wall 34 side of the slit nozzle 30. As described above, the coating liquid R is stored in the storage portion 4 while leaning to the fourth wall 34 side to which the second supply tube 133 (see FIG. 3) is connected. Accordingly, when the first illumination unit 72, the imaging unit 73, the second illumination unit 74, and the reflecting member 75 are disposed close to the fourth wall 34 side, it is possible to detect a state where the liquid surface of the coating liquid R is biased or flattened more properly as compared to a case where the first illumination unit 72, the imaging unit 73, the second illumination unit 74, and the reflecting member 75 are disposed close to, for example, the third wall 33 side.

The slit nozzle 30 and peripheral devices thereof are configured as described above, and in the coating apparatus 1, the liquid surface of the coating liquid R stored within the storage portion 4 is detected by illuminating the inside of the storage portion 4 by using the first illumination unit 72, and imaging the inside of the storage portion 4 by using the imaging unit 73.

Figure 7A:
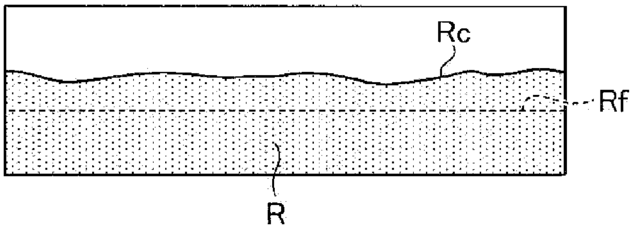
FIG. 7A is a view illustrating an appearance of a liquid surface when a first illumination unit is not used.
Figure 7B:
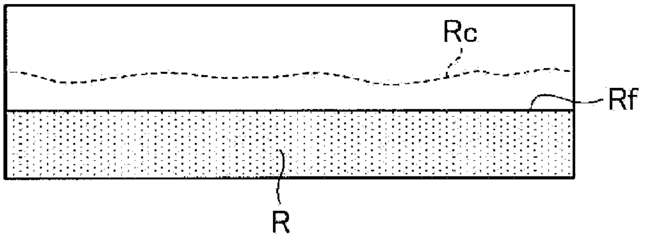
FIG. 7B is a view illustrating an appearance of a liquid surface when the first illumination unit is used.

These features will be described by comparing to a case where imaging is performed only by the imaging unit 73 without the first illumination unit 72. FIG. 7A is a view illustrating an appearance of the liquid surface when the first illumination unit 72 is not used, and FIG. 7B is a view illustrating an appearance of the liquid surface when the first illumination unit 72 is used.

The coating liquid R which is a high viscosity fluid is easily stuck fast to a wall surface of the transparent member 321 (see FIG. 4). In a state where the coating liquid R is stuck fast to the wall surface of the transparent member 321 in this manner, when imaging is performed only by the imaging unit 73 without the first illumination unit 72, as illustrated in FIG. 7A, a front end portion Rc of the coating liquid R stuck fast to the wall surface of the transparent member 321 may be erroneously detected as an actual liquid surface Rf of the coating liquid R.

In contrast, in the coating apparatus 1 according to the present exemplary embodiment, the inside of the storage portion 4 is illuminated by using the first illumination unit 72 from the opposite side (rear side) to the imaging side of the imaging unit 73. Accordingly, due to a contrast difference between the light transmitted through the coating liquid R stored within the storage portion 4, and the light transmitted through the coating liquid R stuck fast to the wall surface of the transparent member 321, the coating liquid R stuck fast to the wall surface of the transparent member 321 may be hardly seen. As a result, it is possible to suppress the front end portion Rc of the coating liquid R stuck fast to the wall surface of the transparent member 321 from being erroneously detected, and to properly detect the liquid surface Rf of the coating liquid R.

Figure 8:
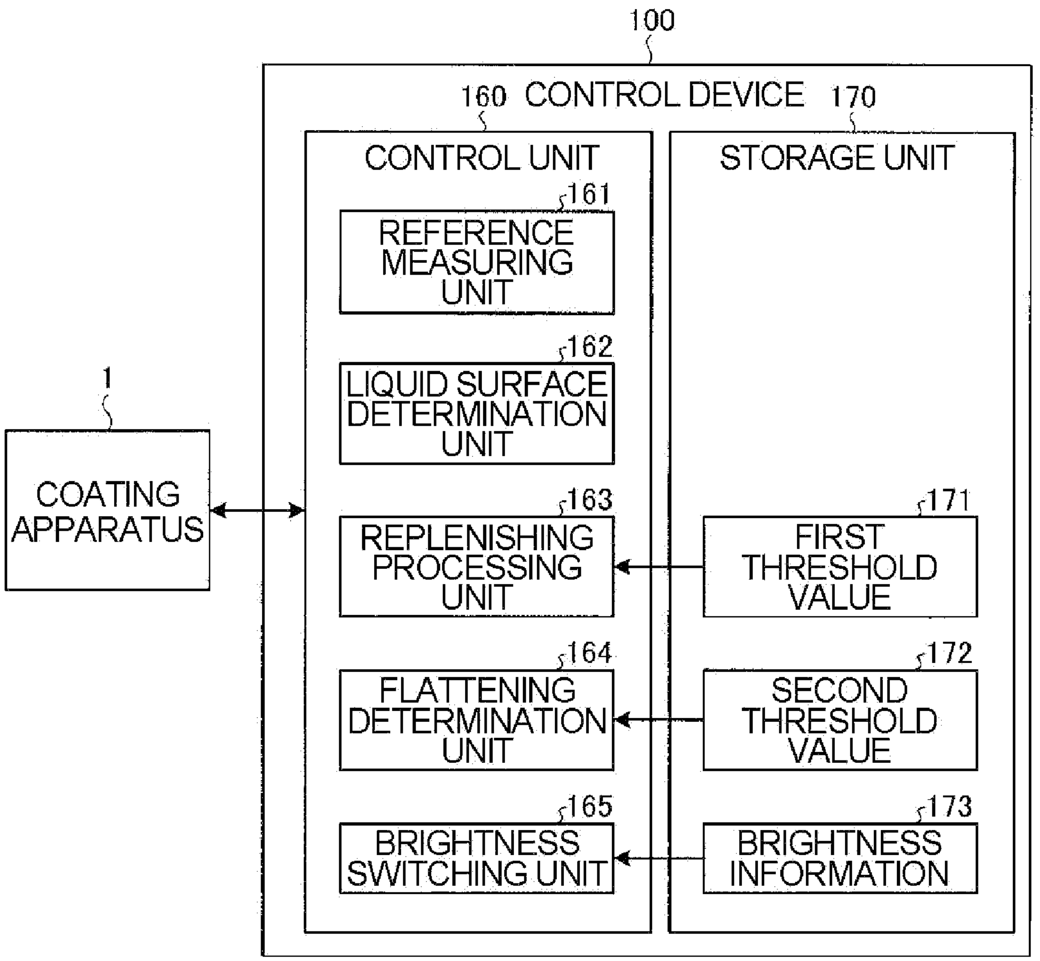
FIG. 8 is a block diagram illustrating a configuration of a control device.

Hereinafter, the configuration of the control device 100 will be described with reference to FIG. 8. FIG. 8 is a block diagram illustrating the configuration of the control device 100. In FIG. 8, only some elements required for explaining the features of the control device 100 are illustrated, and general elements are not illustrated.

As illustrated in FIG. 8, the control device 100 includes a control unit 160 and a storage unit 170. The control unit 160 includes a reference measuring unit 161, a liquid surface determination unit 162, a replenishing processing unit 163, a flattening determination unit 164, and a brightness switching unit 165. The storage unit 170 stores a first threshold value 171, a second threshold value 172, and brightness information 173.

The reference measuring unit 161 is a processing unit configured to image the reference portions 393 and 394 formed on the window unit 39 of the slit nozzle 30 and calculate a size per pixel from such an image of the reference portions 393 and 394.

Specifically, the reference measuring unit 161 images the reference portions 393 and 394 provided on the surface of the window unit 39 which faces the imaging unit 73 using the imaging unit 73 while illuminating the surface using the second illumination unit 74 (see FIG. 4). As described above, the second illumination unit 74 obliquely irradiates a light toward the surface of the window unit 39 which faces the imaging unit 73. Accordingly, it is easy to image the reference portions 393 and 394 as shadows.

Subsequently, the reference measuring unit 161 calculates a size per pixel by dividing an actual distance D between the reference portions 393 and 394 (see FIG. 6) by the number of pixels between the reference portions 393 and 394 of an image imaged by the imaging unit 73.

When the size per pixel is calculated in this manner, it is possible to express the level of the liquid surface of the coating liquid R as numerals in a following liquid surface determination process to be performed by the liquid surface determination unit 162.

The liquid surface determination unit 162 is a processing unit which determines the liquid surface of the coating liquid R stored within the storage portion 4 based on an image imaged by the imaging unit 73.

Figure 9A:
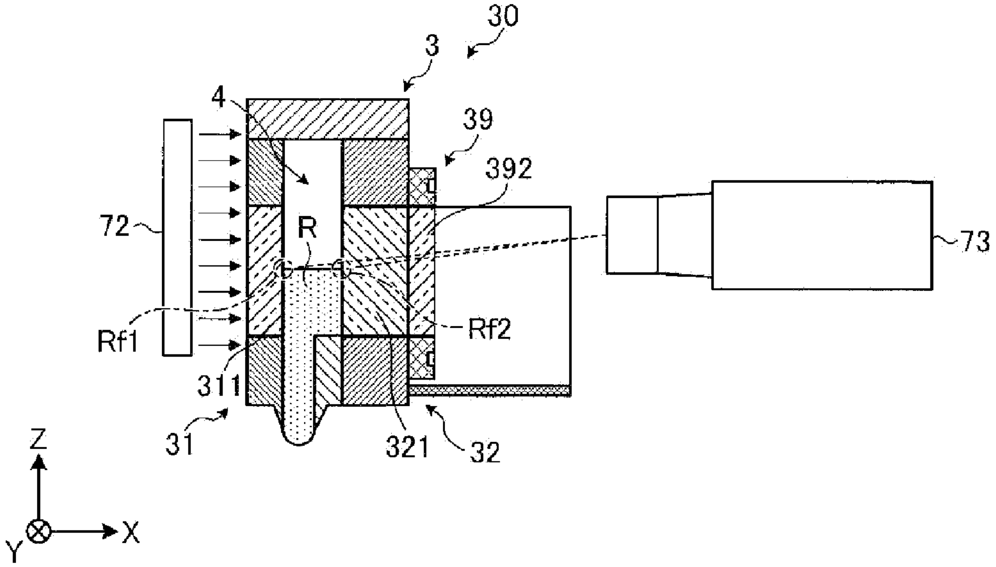
FIG. 9A is an explanatory view of a liquid surface determination process.
Figure 9B:
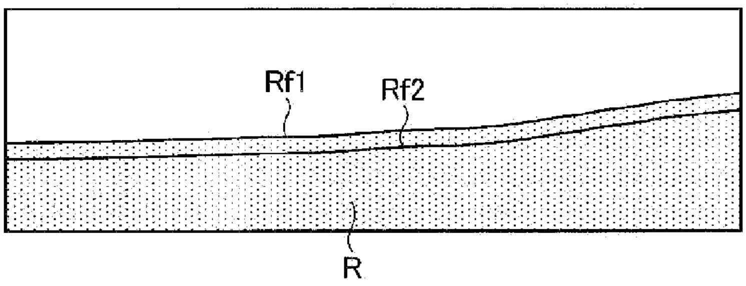
FIG. 9B is an explanatory view of the liquid surface determination process.

Here, descriptions will be made on the liquid surface determination process by the liquid surface determination unit 162 with reference to FIGS. 9A and 9B. FIGS. 9A and 9B are explanatory views of the liquid surface determination process.

As illustrated in FIG. 9A, the liquid surface determination unit 162 images the inside of the storage portion 4 using the imaging unit 73 while illuminating the inside of the storage portion 4 using the first illumination unit 72. Accordingly, as described above, the coating liquid R stuck fast to the wall surface of the transparent member 321 is hardly seen, and thus, the liquid surface is suppressed from being erroneously detected.

Here, the imaging unit 73 is disposed at a higher position than the liquid surface of the coating liquid R stored within the storage portion 4. That is, the amount of the coating liquid R stored within the storage portion 4 is set such that the liquid surface is not higher than the imaging unit 73. Accordingly, the imaging unit 73 is always placed to image the liquid surface of the coating liquid R diagonally from the upper side.

Accordingly, as illustrated in FIG. 9B, the image imaged by the imaging unit 73 may include a liquid surface line Rf1 at the depth side (that is, the first wall 31 side) when viewed from the imaging unit 73, and a liquid surface line Rf2 at the near front side (that is, the second wall 32 side).

When the image imaged by the imaging unit 73 includes the two liquid surface lines Rf1 and Rf2, the liquid surface determination unit 162 determines the liquid surface line Rf1 located at the uppermost position of the image as a liquid surface Rf (see FIG. 7B) of the coating liquid R.

Specifically, the imaging unit 73 performs imaging in two tones of black and white, and the liquid surface determination unit 162 generates histograms of the image imaged by the imaging unit 73. The liquid surface determination unit 162 performs a threshold processing on the generated histograms, and determines the position of a peak located at the uppermost position of the image, among peaks not lower than a threshold value, as the liquid surface Rf of the coating liquid R.

As described above, the liquid surface line (here, the liquid surface line Rf1 at the first wall 31 side) at the upper side of the image is determined as the liquid surface Rf of the coating liquid R. Thus, even if bubbles are mixed into the coating liquid R stored within the storage portion 4, it is possible to suppress the liquid surface Rf from being erroneously detected due to the bubbles.

In the present exemplary embodiment, a transparent coating liquid R is used. However, when an opaque or colored coating liquid R is used, the liquid surface line Rf2 at the second wall 32 side may not be seen. Meanwhile, when the liquid surface line Rf1 at the first wall 31 side is determined as the liquid surface Rf of the coating liquid R, it is possible to obtain the same determination result regardless whether the coating liquid R is transparent or opaque/colored.

Here, in the above described exemplary case, the imaging unit 73 images the liquid surface Rf diagonally from the upper side of the liquid surface Rf of the coating liquid R stored in the storage portion 4. However, the imaging unit 73 may image the liquid surface Rf diagonally from the lower side of the liquid surface Rf of the coating liquid R stored in the storage portion 4. In this case, since the liquid surface line Rf2 at the second wall 32 side is located at a position higher than the liquid surface line Rf1 at the first wall 31 side on the image, the liquid surface line Rf2 at the second wall 32 side is determined as the liquid surface Rf of the coating liquid R.

Figure 10A:
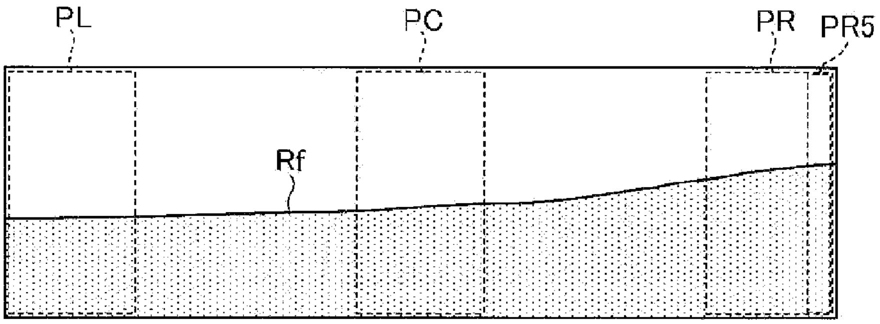
FIG. 10A is an explanatory view of a liquid surface level calculation process.
Figure 10B:
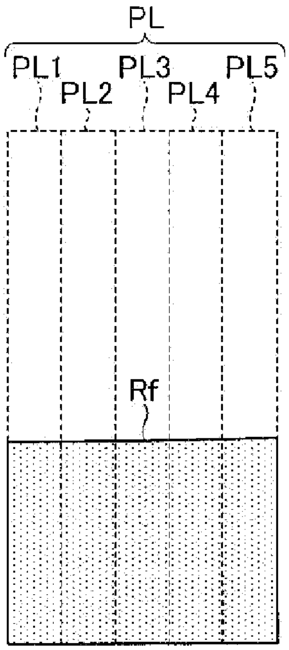
FIG. 10B is an explanatory view of the liquid surface level calculation process.

After determining the liquid surface Rf, the liquid surface determination unit 162 performs a liquid surface level calculation process to calculate the level of the liquid surface Rf. Here, the liquid surface level calculation process will be described with reference to FIGS. 10A and 10B. FIGS. 10A and 10B are explanatory views of the liquid surface level calculation process.

As illustrated in FIG. 10A, the liquid surface determination unit 162 calculates liquid surface levels at three positions of the image (both left and right end portions PL and PR and a central portion PC), respectively. Hereinafter, a specific calculation sequence will be described with reference to an exemplary case where the liquid surface level of the left end portion PL is calculated.

As illustrated in FIG. 10B, the left end portion PL is divided into a plurality of areas (here, 5 areas) PL1 to PL5, and the liquid surface determination unit 162 calculates each of the liquid surface levels in the areas PL1 to PL5. The liquid surface level is calculated by multiplying the number of pixels from the lowermost end of the image to the liquid surface Rf, by the size per pixel calculated by the reference measuring unit 161.

Subsequently, the liquid surface determination unit 162 excludes areas having the highest and lowest liquid surface levels from the areas PL1 to PL5, and then calculates an average value of the liquid surface levels of the remaining areas as the liquid surface level of the left end portion PL. For example, when the area PL5 has the highest liquid surface level, and the area PL1 has the lowest liquid surface level, the liquid surface determination unit 162 calculates the average value of the liquid surface levels of the areas PL2 to PL4 as the liquid surface level of the left end portion PL.

As described above, when the areas having the highest and lowest liquid surface levels are excluded from liquid surface level calculation targets, it is possible to suppress erroneous detection of the liquid surface level which may be caused by, for example, mixing of bubbles into the coating liquid R.

The liquid surface determination unit 162 calculates each of the liquid surface level of the right end portion PR, and the liquid surface level of the central portion PC in the same sequence as described above. The liquid surface determination unit 162 transmits the calculated liquid surface levels of the left end portion PL, the right end portion PR, and the central portion PC to the flattening determination unit 164.

The number of divisions and the division width of both left and right end portions PL and PR and the central portion PC may be set to be appropriately changed. Here, the liquid surface levels at the three positions of the left end portion PL, the right end portion PR and the central portion PC are calculated, but the liquid surface determination unit 162 may calculate the liquid surface levels of only two positions of, for example, the left end portion PL and the right end portion PR.

Among the plurality of divided areas of the right end portion PR, the liquid surface determination unit 162 transmits the liquid surface level of the rightmost area PR5, that is, the liquid surface level at the supply side of the coating liquid R, to the replenishing processing unit 163.

The replenishing processing unit 163 is a processing unit which controls initiation and stop of replenishing of the coating liquid R into the storage portion 4.

First, the replenishing processing unit 163 initiates the replenishing of the coating liquid R into the storage portion 4 from the intermediate tank 130 by operating the supply pump 140.

Here, the replenishing processing unit 163 performs the replenishing of the coating liquid R into the storage portion 4 while adjusting the pressure within the storage portion 4 using the pressure control unit 110. Specifically, the replenishing processing unit 163 adjusts the pressure within the storage portion 4 to a negative pressure. Accordingly, the coating liquid R remaining within the storage portion 4 is suppressed from being leaked from the ejecting port 6. The replenishing processing unit 163 performs the replenishing of the coating liquid R while gradually reducing the pressure within the storage portion 4, which has been adjusted to the negative pressure, (that is, while increasing the vacuum degree) according to the liquid surface level input from the liquid surface determination unit 162.

As described above, the replenishing processing unit 163 controls the pressure control unit 110 so that the inside of the storage portion 4 is adjusted to a negative pressure, and performs the replenishing of the coating liquid R into the storage portion 4 while gradually reducing the pressure within the storage portion 4 which has been adjusted to the negative pressure.

Subsequently, when the liquid surface level input from the liquid surface determination unit 162, that is, the liquid surface level of the rightmost area PR5 of the right end portion PR (see FIG. 10A), reaches the first threshold value 171 stored in the storage unit 170, the replenishing processing unit 163 stops the supply pump 140 and stops the replenishing of the coating liquid R into the storage portion 4.

The first threshold value 171 is set to a value higher than a required liquid surface level. Specifically, the first threshold value 171 is a value which is expected to allow a required liquid surface level to be achieved when the coating liquid R is flattened upon stopping the replenishing of the coating liquid R when the liquid surface level of the area PR5 reaches the first threshold value 171. The first threshold value 171 is determined by, for example, a test which is performed in advance.

In the coating apparatus 1 according to the present exemplary embodiment, the liquid surface level of the coating liquid R is digitized, and thus, the liquid surface levels may be arbitrarily set and changed by changing the value of the first threshold value 171.

The flattening determination unit 164 is a processing unit which determines whether the liquid surface of the coating liquid R within the storage portion 4 is flattened based on the determination result by the liquid surface determination unit 162.

Specifically, the flattening determination unit 164 acquires the liquid surface levels of the left end portion PL, the right end portion PR and the central portion PC from the liquid surface determination unit 162. As described above, the liquid surface levels are obtained by dividing a part of the image into a plurality of areas, and calculating an average value of the liquid surface levels of the plurality of areas except for the areas having the highest and lowest liquid surface levels, as the liquid surface levels of the part of the image. The flattening determination unit 164 determines that the liquid surface of the coating liquid R within the storage portion 4 is flattened when the difference in height of the liquid surface levels is less than the second threshold value 172 stored in the storage unit 170.

As described above, when the liquid surface levels at three positions including the both left and right end portions PL and PR which are most likely to show the difference in height of liquid surfaces are monitored after the replenishing of the coating liquid R, the flattening of the liquid surface may be appropriately determined.

As described above, in the coating apparatus 1 according to the present exemplary embodiment, the liquid surface levels of the coating liquid R are digitized, and thus, an allowable flatness degree of the liquid surface may be arbitrarily set and changed by changing the value of the second threshold value 172.

The brightness switching unit 165 is a processing unit which switches the brightness of the first illumination unit 72 according to the brightness information 173 stored in the storage unit 170.

Specifically, the brightness information 173 includes two brightness levels including a first brightness and a second brightness which is higher than the first brightness. The first brightness is a brightness set for a transparent coating liquid R, and the second brightness is a brightness set for coating liquids R other than the transparent coating liquid R. The second brightness is higher than the first brightness.

The brightness switching unit 165 switches the brightness of the first illumination unit 72 between the first brightness and the second brightness according to a command from a user. This will be described later with reference to FIG. 12.

Figure 11:
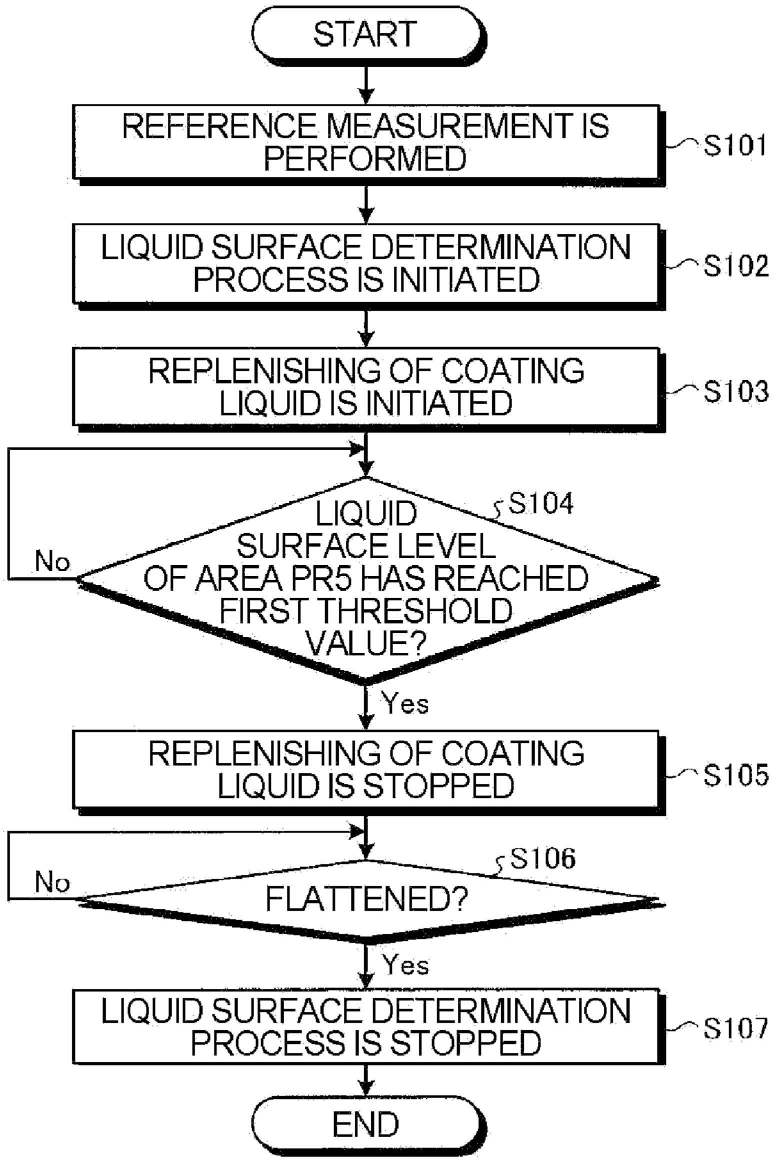
FIG. 11 is a flow chart illustrating a sequence of processing a coating liquid replenishing process.

Hereinafter, a sequence of processing a coating liquid replenishing process to be performed by the coating apparatus 1 will be described with reference to FIG. 11. FIG. 11 is a flow chart illustrating a sequence of processing a coating liquid replenishing process.

As illustrated in FIG. 11, in the coating apparatus 1, first, a reference measurement process is performed (step S101). In the reference measurement process, the reference measuring unit 161 images the reference portions 393 and 394 provided on the surface of the window unit 39 which faces the imaging unit 73 using the imaging unit 73 while illuminating the surface using the second illumination unit 74 (see FIG. 4). The reference measuring unit 161 calculates a size per pixel by dividing an actual distance D between the reference portions 393 and 394 (see FIG. 6) by a distance (the number of pixels) between the reference portions 393 and 394 of the image imaged by the imaging unit 73. Then, the second illumination unit 74 is turned off.

Subsequently, in the coating apparatus 1, a liquid surface determination process is initiated (step S102). In the liquid surface determination process, a liquid surface determination unit 162 images the inside of the storage portion 4 using the imaging unit 73 while illuminating the inside of the storage portion 4 using the first illumination unit 72. Here, the imaging unit 73 performs imaging in two tones of black and white. The liquid surface determination unit 162 generates histograms of the image imaged by the imaging unit 73, and determines the position of a peak located at the uppermost position of the image, among peaks not lower than a threshold value in the generated histograms, as a liquid surface of the coating liquid R.

The liquid surface determination unit 162 calculates liquid surface levels at a left end portion PL, a right end portion PR, and a central portion PC (see FIG. 10A) of the image, transmits the calculated liquid surface levels to the flattening determination unit 164, and transmits a liquid surface level of an area PR5 of the right end portion PR to the replenishing processing unit 163.

Subsequently, in coating apparatus 1, the replenishing processing unit 163 initiates the replenishing of the coating liquid R (step S103). The replenishing processing unit 163 determines whether the liquid surface level of the area PR5 (see FIG. 10A) has reached a first threshold value 171 (step S104), and stops the replenishing of the coating liquid R (step S105) when determining that the liquid surface level has reached the first threshold value 171 (step S104, Yes). When the liquid surface level of the area PR5 has not reached the first threshold value 171 (step S104, No), the replenishing processing unit 163 repeats the determination process in step S104 until the liquid surface level of the area PR5 reaches the first threshold value 171.

Subsequently, in the coating apparatus 1, the flattening determination unit 164 determines whether the liquid surface Rf of the coating liquid R within the storage portion 4 is flattened (step S106). Specifically, the flattening determination unit 164 determines that the liquid surface Rf of the coating liquid R within the storage portion 4 is flattened when the difference in height of the liquid surface levels of the left end portion PL, the right end portion PR and the central portion PC is less than a second threshold value 172. When the liquid surface Rf of the coating liquid R is not flattened (step S106, No), the flattening determination unit 164 repeats the determination process in step S106 until the liquid surface Rf of the coating liquid R is flattened.

When the flattening determination unit 164 determines that the liquid surface Rf of the coating liquid R is flattened (step S106, Yes), the liquid surface determination unit 162 stops the liquid surface determination process (step S107). Specifically, the first illumination unit 72 is turned off so that imaging by the imaging unit 73 is stopped. After step S107 is completed, the coating apparatus 1 terminates the sequence of the coating liquid replenishing process. When the coating liquid replenishing process is completed, the coating apparatus 1 proceeds to a nozzle priming process of wiping the tip end of the slit nozzle 30 by using the slit nozzle cleaning unit 60 (see FIG. 1), and arranging the state of the ejecting port 6, or the coating process illustrated in FIG. 2.

In the above described exemplary embodiments, as an example of the coating liquid R, a transparent coating liquid R is used. However, there exists a non-transparent coating liquid R, such as an opaque or colored coating liquid R. Accordingly, descriptions will be made on optimum imaging conditions for the transparent coating liquid R and the non-transparent coating liquids R, respectively, in the liquid surface determination process with reference to FIG. 12. FIG. 12 is a view illustrating the relationship between the kind of a coating liquid R, and illumination units 72 and 74 to be used, a brightness of the first illumination unit 72, and an imaging angle of an imaging unit 73.

As illustrated in FIG. 12, when a transparent coating liquid R such as, for example, a resist is used, as described above, it is desirable that, among the first illumination unit 72 and the second illumination unit 74, only the first illumination unit 72 is used and set to have a first brightness, and the imaging angle of the imaging unit 73 is inclined toward the liquid surface Rf.

Meanwhile, when a non-transparent coating liquid R such as, for example, an underfill, is used, it is desirable that both the first illumination unit 72 and the second illumination unit 74 are used, and the first illumination unit 72 is set to have a second brightness which is higher than the first brightness. When the non-transparent coating liquid R is used, the imaging angle of the imaging unit 73 may be horizontal to the liquid surface Rf.

In the coating apparatus 1, for example, a user may input the kind of the coating liquid R (transparent or non-transparent), and according to the input result, the liquid surface determination unit 162 and the brightness switching unit 165 may switch the illumination units 72 and 74 to be used, and the brightness of the first illumination unit 72, respectively. Accordingly, in the liquid surface determination process, the transparent coating liquid R and the non-transparent coating liquid R may be imaged under optimum conditions, respectively.

As described above, the coating apparatus 1 according to the present exemplary embodiment includes a slit nozzle 30, a first moving mechanism 20, a first illumination unit 72 and an imaging unit 73. The slit nozzle 30 includes an elongated main body 3, a storage portion 4 within the main body 3 to store a coating liquid R, and a slit-shaped ejecting port 6 configured to eject the coating liquid R fed from the storage portion 4 through a slit-shaped flow path 5. At least a part of each of a first wall 31 and a second wall 32 which face each other in the main body 3 is formed of a transparent member 311 and 321. A first moving mechanism 20 moves the slit nozzle 30 with respect to a substrate W. A first illumination unit 72 illuminates the inside of the storage portion 4 through the transparent member 311 of the first wall 31. An imaging unit 73 images the inside of the storage portion 4 through the transparent member 321 of the second wall 32.

According to the coating apparatus 1 according to the present exemplary embodiment, the liquid surface Rf of the coating liquid R stored within the slit nozzle 30 may be appropriately detected.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A coating apparatus comprising:

a slit nozzle including an elongated main body fixed to a fixing member, a storage tank having a first wall and a second wall facing with each other and configured to store a coating liquid within the main body, and a slit-shaped ejecting port configured to eject the coating liquid fed from the storage tank through a slit-shaped flow path to an upper surface of a substrate, at least a part of each of the first wall and the second wall being formed of a transparent member and at least two reference portions being formed on a surface of the second wall;

a moving mechanism including a substrate holding unit formed with a suction port configured to hold the substrate in a horizontal direction and a driving unit including a first motor configured to move the substrate holding unit in a horizontal direction with respect to the slit nozzle;

an elevating mechanism extending in a vertical direction and including a second motor configured to move the slit nozzle fixed to the fixing member in the vertical direction;

a first light source fixed to the fixing member to be positioned at a side of the first wall of the storage tank, and configured to irradiate light toward an inside of the storage tank through the transparent member of the first wall;

a second light source fixed to the fixing member to be positioned at a side of the second wall of the storage tank, and configured to irradiate light toward the surface of the second wall where the at least two reference portions are formed;

a camera fixed to the fixing member to be positioned at the side of the second wall of the storage tank and configured to capture either one of an image of the inside of the storage tank through the transparent member of the second wall or an image of the surface of the second wall where the reference portions are formed; and a controller configured to control an overall operation of the coating apparatus including the slit nozzle, the moving mechanism, the elevating mechanism, the first light source, the second light source, and the camera, wherein the controller is configured to:

capture the image of the surface of the second wall where the reference portions are formed while the second light source irradiates the light toward the surface of the second wall where the reference portions are formed and the first light source is being turned OFF;

capture the image of the inside of the storage tank while the first light source irradiates the light toward the inside of the storage tank through the transparent member of the first wall and the second light source is being turned OFF; and calculate a pixel size from the images captured by the camera thereby detecting a liquid surface of the coating liquid in the storage tank.

2. The coating apparatus of claim 1, wherein the reference portions being used for calculating the pixel size of the images captured by the camera based on a number of pixels between the reference portions and an actual distance between the reference portions.

3. The coating apparatus of claim 2, wherein the second light source obliquely irradiates a light toward the surface of the second wall which faces the camera.

4. The coating apparatus of claim 1, wherein the camera captures the liquid surface of the coating liquid stored in the storage tank from an upper side or a lower side of the liquid surface, and when a plurality of liquid surface lines is included in the image captured by the camera, the controller is further configured to determine a liquid surface line located at an uppermost position among the plurality of liquid surface lines as the liquid surface.

5. The coating apparatus of claim 4, wherein the controller is further configured to determine whether the liquid surface is flattened based on the liquid surface line.

6. The coating apparatus of claim 5, wherein the controller is further configured to determine that the liquid surface is flattened when a difference in height of liquid surfaces at least at left and right end portions of the image is less than a threshold value.

7. The coating apparatus of claim 6, wherein the controller is further configured to divide each of the left and right end portions into a plurality of areas, and use an average value of liquid surface levels of the plurality of areas except for areas having highest and lowest liquid surface levels in each of the left and right end portions, as a liquid surface level of each of the left and right end portions.

8. The coating apparatus of claim 1, further comprising a brightness switch configured to switch a brightness of the first light source between a first brightness and a second brightness which is higher than the first brightness, wherein the first brightness is a brightness in a case where a transparent coating liquid is stored in the storage tank, and the second brightness is a brightness in a case where a coating liquid other than the transparent coating liquid is stored in the storage tank.

9. The coating apparatus of claim 1, wherein at least one of the first light source and the second light source is formed with a charge coupled device (CCD).

10. The coating apparatus of claim 1, wherein the transparent member is one of a glass or an acrylic resin.

11. A method of detecting a liquid surface in a slit nozzle including an elongated main body fixed to a fixing member, a storage tank having a first wall and a second wall facing with each other and configured to store a coating liquid within the main body, and a slit-shaped ejecting port configured to eject the coating liquid fed from the storage tank through a slit-shaped flow path to an upper surface of a substrate, at least a part of each of the first wall and the second wall being formed of a transparent member and at least two reference portions being formed on a surface of the second wall, the method comprising:

providing a first light source and a second light source in each of a side of the first wall and a side of the second wall, and providing a camera in the side of the second wall;

capturing an image of a surface of the second wall where the at least two reference portions are formed using the camera while irradiating light toward the surface of the second wall by the second light source and the first light source is being turned OFF;

imaging capturing an image of the inside of the storage tank unit using the camera through the transparent member of the second wall of the storage tank while irradiating light toward the inside of the storage tank by the first light source through the transparent member of the first wall and the second light source is being turned OFF;

calculating a pixel size from the image captured at the capturing the surface of the second wall and the image captured at the capturing the inside of the storage tank; and determining a liquid surface of the coating liquid stored within the storage tank based on the pixel size calculated at the calculating.

12. The method of claim 11, wherein, in the irradiating light toward the inside of the storage tank, the inside of the storage tank is irradiated with a first brightness when a transparent coating liquid is stored in the storage tank, and the inside of the storage tank is irradiated with a second brightness which is higher than the first brightness when a coating liquid other than the transparent coating liquid is stored in the storage tank.

13. The method of claim 11, wherein in the irradiating light toward the transparent surface of the second wall, the second light source obliquely irradiates the light toward the transparent surface of the second wall.

14. The method of claim 11, wherein the calculating further comprising dividing an actual distance between the reference portions by a number of pixels between the reference portions.

* * * * *